UNITED STATES PATENT OFFICE.

OTTOKAR SERPEK, OF PARIS, FRANCE, ASSIGNOR TO SOCIÉTÉ GÉNÉRALE DES NITRURES, OF PARIS, FRANCE.

PROCESS OF PRODUCING ALUMINUM NITRID.

987,408.

No Drawing.

Specification of Letters Patent. Patented Mar. 21, 1911.

Application filed December 15, 1909. Serial No. 533,163.

*To all whom it may concern:*

Be it known that I, OTTOKAR SERPEK, a subject of the Emperor of Austria-Hungary, residing at 12 Rue Roquepine, Paris, France, have invented certain new and useful Improvements in Processes of Producing Aluminum Nitrid, of which the following is a specification.

This invention relates to the production of aluminum nitrid by heating a mixture of carbon and alumina in the presence of nitrogen or in an atmosphere containing nitrogen.

More especially, my invention consists in observing and regulating the temperature required for the said process in a distinct manner.

Numerous processes are already known for the combination of nitrogen with metals. Various metal compounds have the property of uniting with nitrogen to form nitrids if they are heated to a very high temperature in the presence of carbon. It has generally been supposed that this process occurs through the preliminary reduction of the metal compound, for example, aluminum oxid to metal and the subsequent union of this with the nitrogen. It is undoubtedly the fact that many metals, as for example magnesium combine with nitrogen with extreme ease. It is therefore natural that most inventors should have thought that temperatures must be employed which first cause the reduction of a metal compound to metal. Other processes rest upon the fact that not the separation of the metal but the formation of another metal compound, for example carbid, is first aimed at. Upon this are based the known processes which start from calcium carbid or calcium carbid forming mixtures.

The applicant has published and patented a series of processes, the purpose of which is the production of aluminum nitrid through the formation of aluminum carbid. As is well known aluminum nitrid is only formed at very high temperatures, preferably at the temperature of the arc furnace. The applicant has hitherto supposed that in processes for the direct production of nitrid the highest temperature obtainable with the electric furnace should be employed. Very exact experiments in which the temperature has been determined by means of a Wanner optical pyrometer have shown that the greatest formation of nitrid occurs at temperatures far beneath those hitherto considered necessary. These temperatures are so low that the formation of aluminum carbid or aluminum in an atmosphere containing no nitrogen would be impossible.

If a mixture of aluminum or alumina compound and carbon is slowly heated in a current of nitrogen, the thermometer being closely watched, a noticeable combination of nitrogen is found to occur at about 1100 degrees. At 1500 degrees in about a quarter of an hour nitrogen is absorbed up to 5 per cent. At 1700 degrees the combination appears to occur much more energetically with distinct evolution of carbon monoxid, and at 1800 to 1850 degrees the reaction becomes even violent. Almost chemically pure nitrid is formed with an average nitrogen content of about 30 per cent. Alumina and carbon may be mixed in molecular proportions, that is to say 102 parts by weight of alumina, with 36 parts of carbon. Besides pure or impure alumina, such as natural bauxite, aluminum borates or silicates may be used for carrying out the process. The reaction is quite distinct from that which occurs between chalk and carbon under similar circumstances. Calcium carbid forming mixtures only take up about 5 per cent. nitrogen at 1800 degrees.

I claim:—

1. The process of producing aluminum nitrid which process consists in heating a mixture consisting of aluminous compounds and carbon in an atmosphere containing nitrogen at temperatures not exceeding 2000° centigrade.

2. The process of producing aluminum nitrid which process consists in heating a mixture consisting of alumina and carbon in an atmosphere containing nitrogen at temperatures not exceeding 2000° centigrade.

3. The process of producing aluminum nitrid which process consists in heating a mixture consisting of aluminous compounds and carbon in an atmosphere containing nitrogen at a temperature of about 1800° centigrade.

4. The process of producing aluminum nitrid which process consists in heating a mixture consisting of alumina and carbon in an atmosphere containing nitrogen at a temperature of about 1800° centigrade.

In testimony whereof I have signed my name to this specification in the presence of two subscribing witnesses.

OTTOKAR SERPEK.

Witnesses:
GEORGE GIFFORD,
ARNOLD ZUBER.

Copies of this patent may be obtained for five cents each, by addressing the "Commissioner of Patents, Washington, D. C."